United States Patent [19]

Ito et al.

[11] Patent Number: 5,357,834
[45] Date of Patent: Oct. 25, 1994

[54] MITER SAW

[75] Inventors: Katsuyasu Ito; Mitsuyoshi Niinomi, both of Anjo, Japan

[73] Assignee: Makita Corporation, Anjo, Japan

[21] Appl. No.: 63,289

[22] Filed: May 18, 1993

[30] Foreign Application Priority Data

May 22, 1992 [JP] Japan .................. 4-156009

[51] Int. Cl.⁵ .............................. B27B 5/20
[52] U.S. Cl. .................. 83/471.3; 83/486.1; 83/490; 83/581
[58] Field of Search .......... 83/471.3, 486.1, 485, 83/486, 487, 488, 490, 581; 30/264; 173/216

[56] References Cited

U.S. PATENT DOCUMENTS

| | | | |
|---|---|---|---|
| 1,395,150 | 10/1921 | Scalfaro et al. | 30/264 |
| 1,418,053 | 5/1922 | Baumann, Jr. | 30/264 |
| 1,514,696 | 11/1924 | Gury | 30/264 |
| 1,646,589 | 10/1927 | Meek et al. | |
| 3,125,807 | 3/1964 | Bayard | 30/264 |
| 4,537,105 | 8/1985 | Bergler | |
| 4,869,142 | 9/1989 | Sato et al. | |
| 5,054,352 | 10/1991 | Fushiya et al. | 83/490 |

FOREIGN PATENT DOCUMENTS

| | | |
|---|---|---|
| 2050610 | 5/1971 | Fed. Rep. of Germany . |
| 3737814 | 9/1988 | Fed. Rep. of Germany . |
| 1135035 | 4/1957 | France . |
| 1593984 | 6/1970 | France . |
| 6349901 | 9/1986 | Japan . |

Primary Examiner—Eugenia Jones
Assistant Examiner—Allan M. Schrock
Attorney, Agent, or Firm—Dennison, Meserole, Pollack & Scheiner

[57] ABSTRACT

A miter saw includes a base for placing a work thereon and a miter saw unit supported by a support mechanism relative to the base. The miter saw unit supports a saw blade and a motor for driving the saw blade. The motor has a motor shaft extending in a longitudinal direction of the motor. A transmission mechanism serves to transmit rotation of the motor to the saw blade. The support mechanism supports the miter saw unit in such a manner that the miter saw unit is vertically pivotable and that the miter saw unit is laterally pivotable from a vertical position to an inclined position. The rotational axis of the saw blade extends substantially horizontally when the miter saw unit is at the vertical position, and the rotational axis of the saw blade extends obliquely relative to the horizontal direction when the miter saw unit is at the inclined position. The motor is positioned on one lateral side of the miter saw unit toward the inclined position. The motor shaft of the motor extends obliquely relative to the rotational axis of the saw blade in such a manner that the motor shaft extends obliquely upwardly relative to the saw blade when the miter saw unit is at the vertical position.

4 Claims, 9 Drawing Sheets

MITER SAW

BACKGROUND OF THE INVENTION

1. Field of the Invention

The present invention relates to a miter saw, and more particularly to a miter saw in which a miter saw unit supporting a saw blade is pivotable to incline the saw blade relative to a base for placing a work thereon.

2. Description of the Prior Art

In a conventional miter saw having a miter saw unit pivotable to incline a saw blade relative to a base:, there has been a possibility that a cutting operation cannot be properly performed since a motor housing formed on the miter saw unit may abut on a work to be cut when the miter saw unit is inclined. To solve this problem, Japanese Laid-Open Utility Model Publication No. 63-49901 proposes to position a motor shaft of a motor in parallel with a saw blade so as to preclude obstruction caused by a motor housing when a miter saw unit is pivoted.

However, with the prior art construction, because of such parallel positioning of the saw blade and the motor shaft of the motor, the motor is required to be disposed laterally and upwardly of the saw blade, resulting in that a gear train for transmitting rotation of the motor shaft to a spindle of the saw blade must be of multistage type. Therefore, the gear train must involve a number of parts and consequently becomes costly. Further, for this reason, a miter saw tends to become a larger size.

SUMMARY OF THE INVENTION

It is, accordingly, an object of the present invention to provide a miter saw which includes a miter saw unit pivotable to incline a saw blade and which can be constructed to minimize the number of parts of a gear train between a motor shaft and a saw blade.

It is also an object of the present invention to provide a miter saw which is simplified in construction and which can be manufactured at a lower cost.

According to the present invention, there is provided a miter saw comprising:

a base on which a work is placed;

a miter saw unit supporting a saw blade and having a motor for driving the saw blade, the motor having a motor shaft extending in a longitudinal direction of the motor;

a transmission mechanism for transmitting rotation of the motor to the saw blade;

a support mechanism for supporting the miter saw unit relative to the base in such a manner that the miter saw unit is vertically pivotable and that the miter saw unit is laterally pivotable from a vertical position to an inclined position, the rotational axis of the saw blade extending substantially horizontally when the miter saw unit is at the vertical position, and the rotational axis of the saw blade extending obliquely relative to the horizontal direction when the miter saw unit is at the inclined position;

the motor being positioned on one lateral side of the miter saw unit toward the inclined position; and the motor shaft of the motor extending obliquely relative to the rotational axis of the saw blade in such a manner that the motor shaft extends obliquely upwardly relative to the saw blade when the miter saw unit is at the vertical position.

The invention will become more apparent from the appended claims and the description as it proceeds in connection with the drawings.

DETAILED DESCRIPTION OF THE PREFERRED EMBODIMENTS

An embodiment of the present invention will now be explained with reference to the accompanying drawings.

Figure 1:
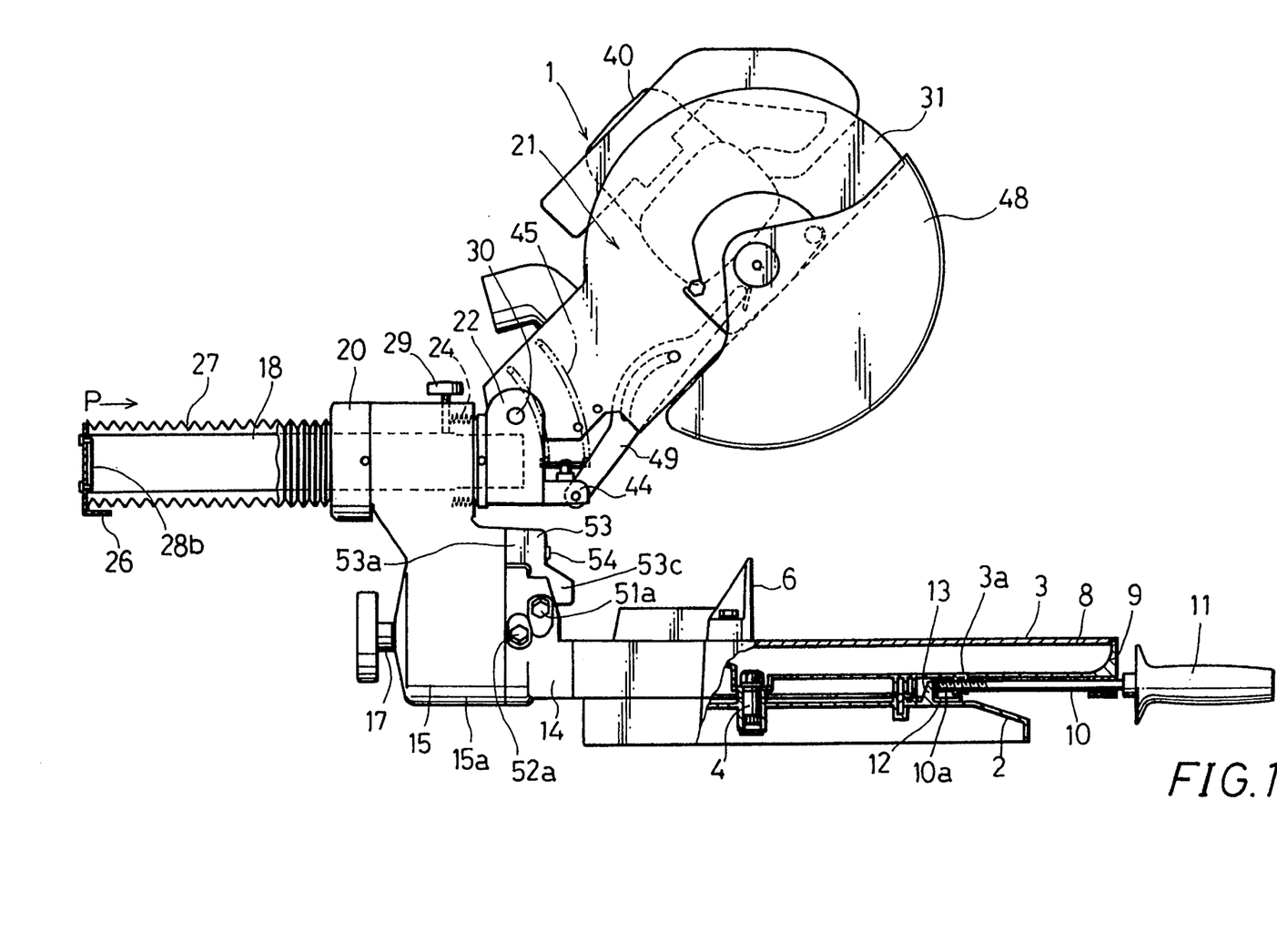
FIG. 1 is a side view, with a part broken away, of a miter saw according to an embodiment of the present invention.

Referring to FIG. 1, there is shown a slide-type miter saw 1 generally including a base 2 and a miter saw unit 21 mounted thereon. The base 2 is served to place a work (not shown) thereon. The miter saw unit 21 is served to support a circular saw blade 36 and a motor 41 which drives the saw blade 36.

Figure 2:
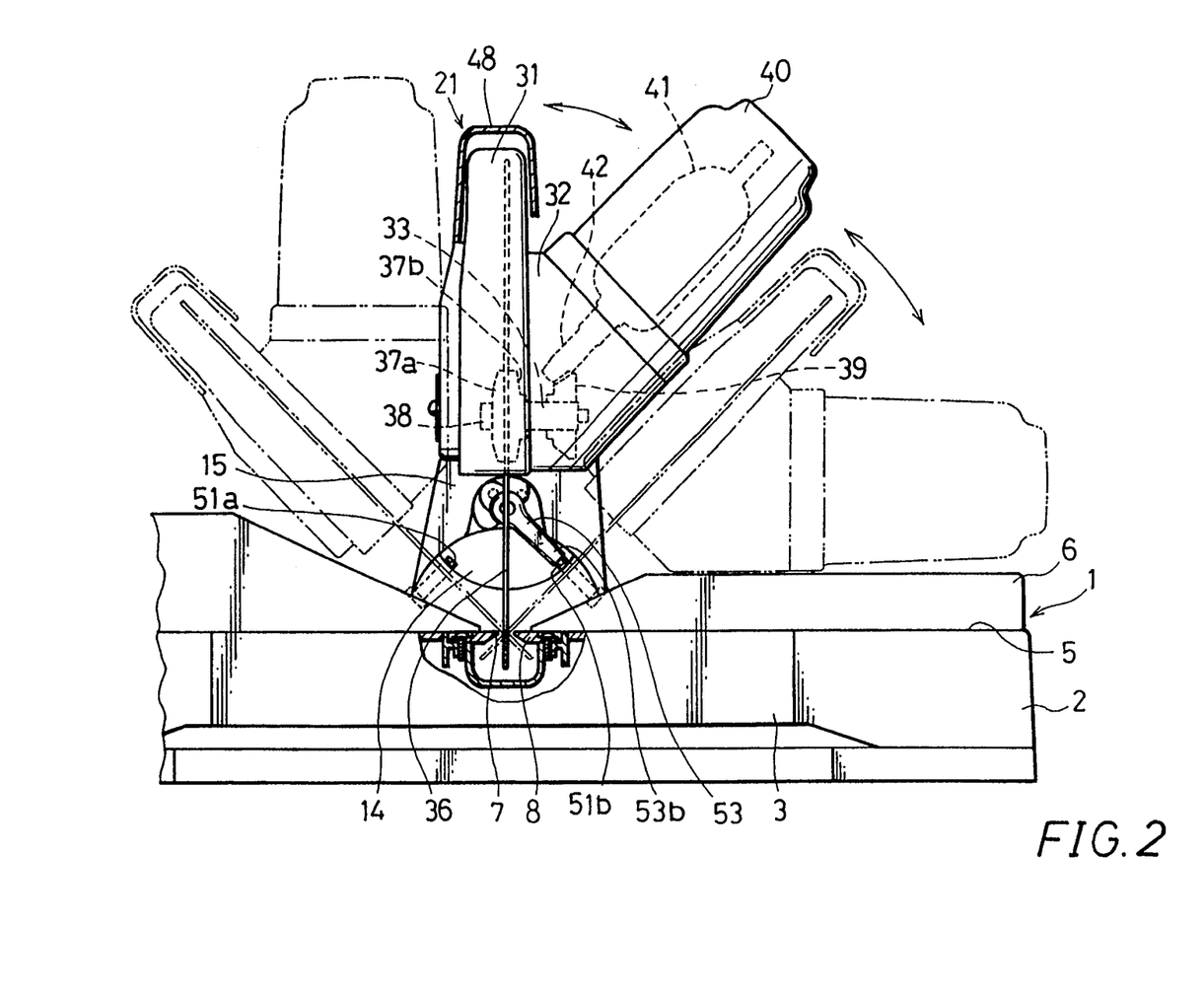
FIG. 2 is an enlarged front view, with a part broken away, of the miter saw.

As shown in FIGS. 1 and 2, the base 2 has a flat configuration and includes a substantially disc-like turntable 3. The turntable 3 is rotatably supported by the base 2 through a vertical support shaft 4 mounted on the central portion of the base 2. Thus, the turntable 3 is rotatable within a horizontal plane. The rotation of the turntable 3 is, however, limited within a predetermined angle. Work support tables 5 are integrally formed on both lateral sides of the base 2. Each of the work support tables 5 has an upper surface which is positioned in substantially the same plane as an upper surface of the turntable 3. A fence 6 extends between the work support tables 5 over the turntable 3 and is positioned on the rear side (left side in FIG. 1) of the work support tables 5. A plate 8 is mounted on the turntable 3 and extends in a diametrical direction of the turntable 3. The plate 8 includes a cut-out recess 7 which is adapted to permit intrusion of the saw blade 36. A support arm 9 extends forwardly outwardly from the periphery of the turntable 3 and is mounted below one end of the plate 8 which extends beyond the periphery of the turntable 3. A support rod 10 is rotatably mounted on the lower portion of the support arm 9 and includes a grip 11 at its forward end. The support rod 10 includes, at its rear portion, a threaded portion 10a which is in engagement with a corresponding threaded hole formed on a protrusion 3a extending downwardly from the turntable 3. The rear end of the support rod 10 is opposed to a wall portion 13 formed on the base 2. A substantially U-shaped leaf spring 12 is interposed between the rear end of the support rod 10 and the wall portion 13. The wall portion 13 has an arcuate configuration corresponding substantially to a locus of rotation of the turntable 3.

A bracket 14 is integrally formed with the peripheral portion of the turntable 3 at a position rearwardly of the plate 8. A support member 15 which supports the miter saw unit 21 is pivotally mounted on the bracket 14 in such a manner that the support member 15 is pivoted laterally leftwardly and laterally rightwardly from a vertical position perpendicular to the upper surface of the base 2.

Figure 4:
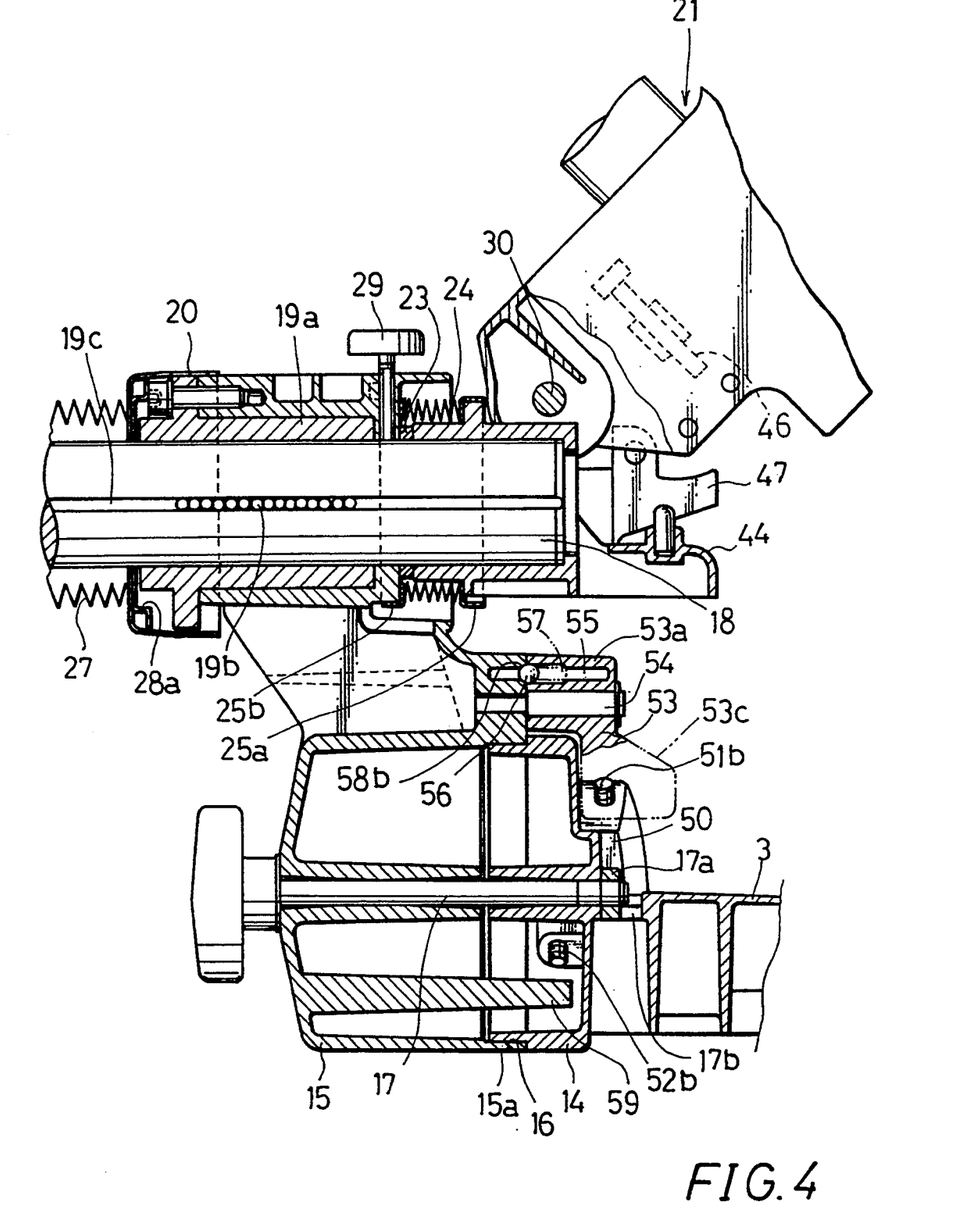
FIG. 4 is an enlarged sectional view of a support mechanism of the miter saw unit.

As shown in FIG. 4, a cylindrical support shaft 16 is formed with the rear end of the bracket 14. The support member 15 includes a cylindrical boss portion 15a which is rotatably fitted on the support shaft 16 of the bracket 14.

A mechanism to releasably fix the position of the support member 15 relative to the bracket 14 is provided and includes a support bolt 17 and a nut 17a for engagement with the support bolt 17. The support bolt 17 is inserted through the central portion of the boss portion 15a and through the central portion of the support shaft 16. One end of the support bolt 17 extends outwardly from the boss portion 15a and includes a knob for operation by an operator. The other end of the support bolt 17 extends outwardly from the support shaft 16 and is in engagement with the nut 17a. The nut 17a is partly received by a recess 17b which is formed on the turntable 3 and has a configuration corresponding substantially to a half of the nut 17a, so that the nut 17a is prevented from rotation relative to the turntable 3.

A slide bar 18 is horizontally slidably mounted on the upper portion of the support member 15. More specifically, the slide bar 18 is slidably received within a tubular bearing 19a which is fixedly fitted within a corresponding tubular support formed on the upper portion of the support member 15. Here, the tubular bearing 19a is constructed as an angular ball spline. Thus, a pair of longitudinal recesses (not shown) are formed on the inner surface of the tubular bearing 19a at positions diametrically opposed to each other, and a pair of longitudinal recesses 19c corresponding to the longitudinal recesses of the tubular bearing 19a are formed on the outer surface of the slide bar 18. A plurality of bearing balls 19b are received within the longitudinal recesses of the tubular bearing 19a on one side and are received within the longitudinal recesses 19c of the slider bar 18 on the other side. The slide bar 18 is therefore slidable in the longitudinal direction relative to the tubular bearing 19a with the aid of bearing balls 19b but is prevented from rotation relative to the tubular bearing 19a. A cap 20 is mounted on the rear end of the upper portion of the support member 15 so as to cover the rear end of the tubular bearing 19a.

A forked bracket-like hinge member 22 is fixed to the forward end of the slide bar 18 which extends from the support member 15. The hinge member 22 vertically pivotally supports the miter saw unit 21 and includes a damper ring 23 disposed at the rear end for abutment on the forward end of the upper portion of the support member 15. A first bellows member 24 is disposed between the hinge member 22 and the upper portion of the support member 15 and protects the forward part of the slide bar 18 exposed to the outside. Mounting rings 25a and 25b are interposed between the hinge member 22 and the first bellows member 24 and between the first bellows member 24 and the support member 15, respectively. A stopper member 26 having substantially L-shaped configuration as shown in FIG. 1 is screwed on the rear end of the slide bar 18 so as to limit the forward movement of the slide bar 18 through abutment on the cover member 20. A second bellows member 27 is disposed between the stopper member 26 and the cover member 20 so as to protect the rear part of the slide bar 18 exposed to the outside. Mounting members 28a and 28b are provided for mounting the second bellows member 27 on the stopper member 26 and the cover member 20, respectively (see FIGS. 1 and 4). A bolt 29 is screwed into the upper part of the support member 15 in a radial direction, so that the bolt 29 abuts on the outer surface of the slide bar 18 so as to fix the slide bar 18 relative to the support member 15 when tightened.

Figure 3:
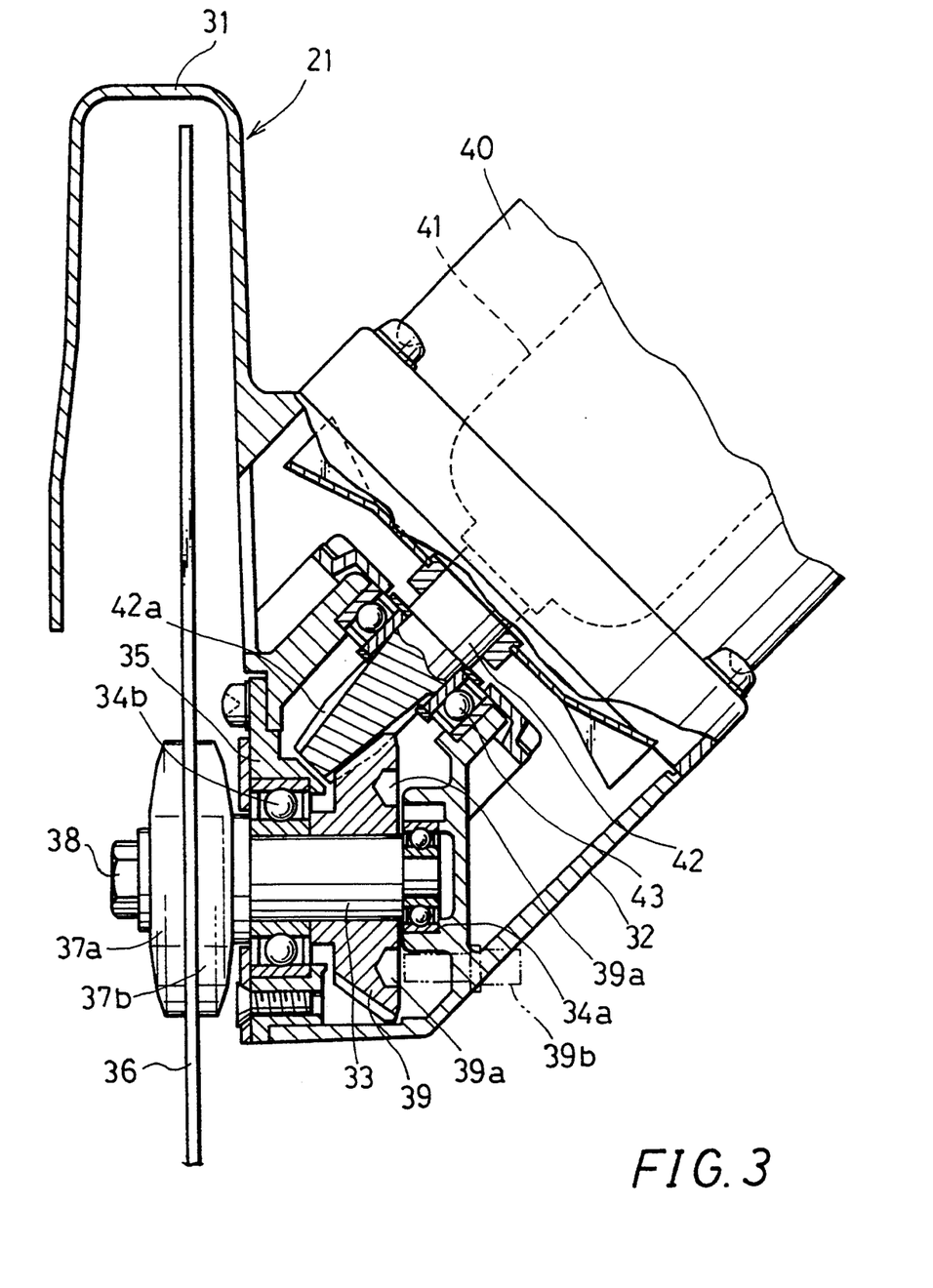
FIG. 3 is an enlarged sectional view of a part of a miter saw unit of the miter saw.
Figure 5:
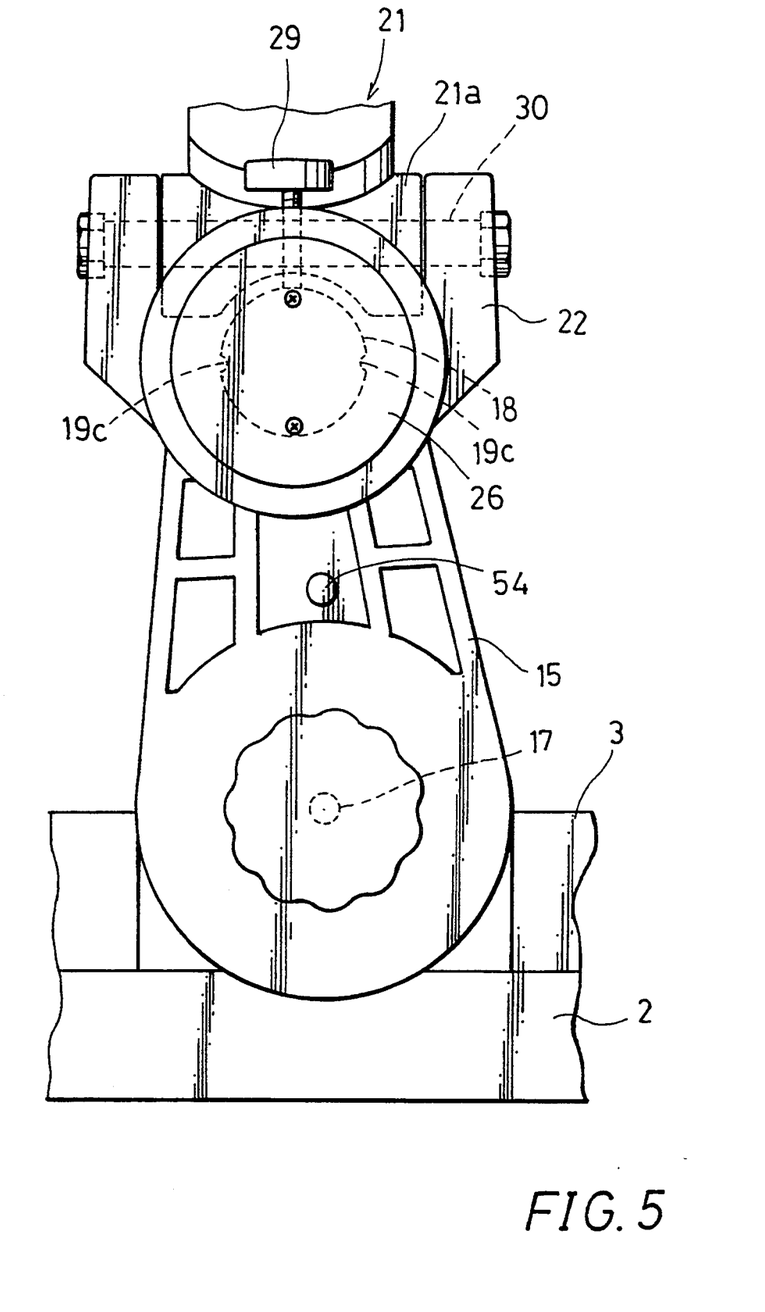
FIG. 5 is a rear view of FIG. 4.

The miter saw unit 21 includes, at its base portion, a boss 21a which is pivotally supported by the hinge member 22 through a support shaft 30 as shown in FIG. 5. As shown in FIGS. 1 to 3, the miter saw unit 21 has a blade case 31 which covers substantially the upper half of the saw blade 36. A gear case 32 is integrally formed with the blade case 31 and extends laterally obliquely therefrom at an angle of 45° relative to the saw blade 36. A spindle 33 is disposed within the lower portion of the gear case 32 and is rotatably supported by a bearing 34a and a bearing 34b which is mounted on the gear case 32 through a retainer 35. The spindle 33 is positioned in parallel with the upper surface of the turntable 3 when the miter saw unit 21 is at a vertical position where the saw blade 36 is positioned perpendicular to the upper surface of the base 2 or the turntable 3. One end of the spindle 33 extends into the blade case 31, and the saw blade 36 is detachably mounted on the one end of the spindle 33 through a pair of mounting flanges 37a and 37b and a bolt 38 which is operable to clamp the saw blade 36 between the mounting flanges 37a and 37b. A bevel gear 39 having a chip angle of 45° and acting as a reduction gear is fixedly mounted on the spindle 33 at a position within the gear case 32.

The gear case 32 includes an open upper end on which a motor housing 40 is fixedly mounted to extend in the same direction as the gear case 32. The motor 41 is disposed within the motor housing 40 and includes a motor shaft 42. The motor shaft 42 extends into the gear case 32 and is rotatably supported by the gear case 32 through a bearing 43. A spur gear 42a is integrally formed with the motor shaft 42 and is positioned above the bevel gear 39 so as to engage the same. Thus, the motor 41 as well as the motor shaft 42 is disposed upwardly of the spindle 33 and is inclined upwardly relative to the spindle 33 at an angle of 45°. A plurality of holes 39a are formed on one end surface of the bevel gear 39 and are spaced from each other in a circumferential direction. A lock pin 39b is movably mounted on the gear case 32 for engagement with either of the holes 39a, so that the rotation of the spindle 33 can be positively stopped when the lock pin 39b engages either of the holes 39a, so that the saw blade 36 can be exchanged to another one.

As shown in FIG. 1, a compression spring 45 is interposed between the base portion of the miter saw unit 21 and the bracket 44 protruding forwardly from the hinge member 22, so that the miter saw unit 21 is normally urged upwardly. As shown in FIG. 4, a stopper bolt 46 is mounted on the base portion of the miter saw unit 21 for abutting on a stopper member 47 which protrudes forwardly from the hinge member 22. The stopper bolt 46 determines the downward stroke end of the miter saw unit 21 through abutment on the stopper member 47 and is operable by the operator to change the downward stroke end. A safety cover 48 is rotatably mounted on the blade case 31 around the same axis as the saw blade 36 or the spindle 33 so as to uncover the half of the saw blade 36 exposed from the blade case 31. The safety cover 48 is operably connected to an operation link 49 which is pivotally mounted on the bracket 44 of the hinge member 22 in such a manner that the safety cover 48 rotates to uncover the saw blade 36 as the miter saw unit 21 is moved downwardly from the uppermost position.

Figure 6:
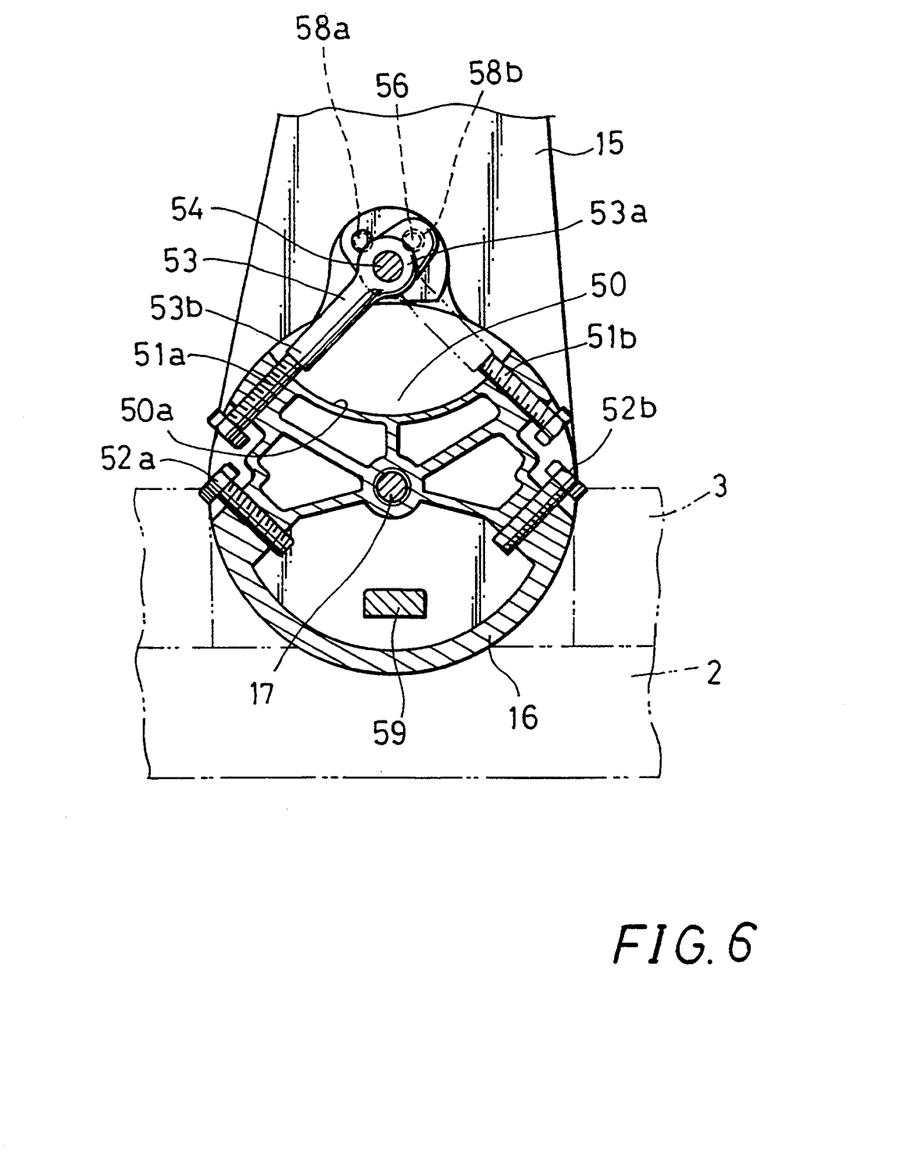
FIG. 6 is an enlarged sectional view showing a relationship between a stopper lever and a first and second pair of stopper bolts of the support mechanism.
Figure 7:
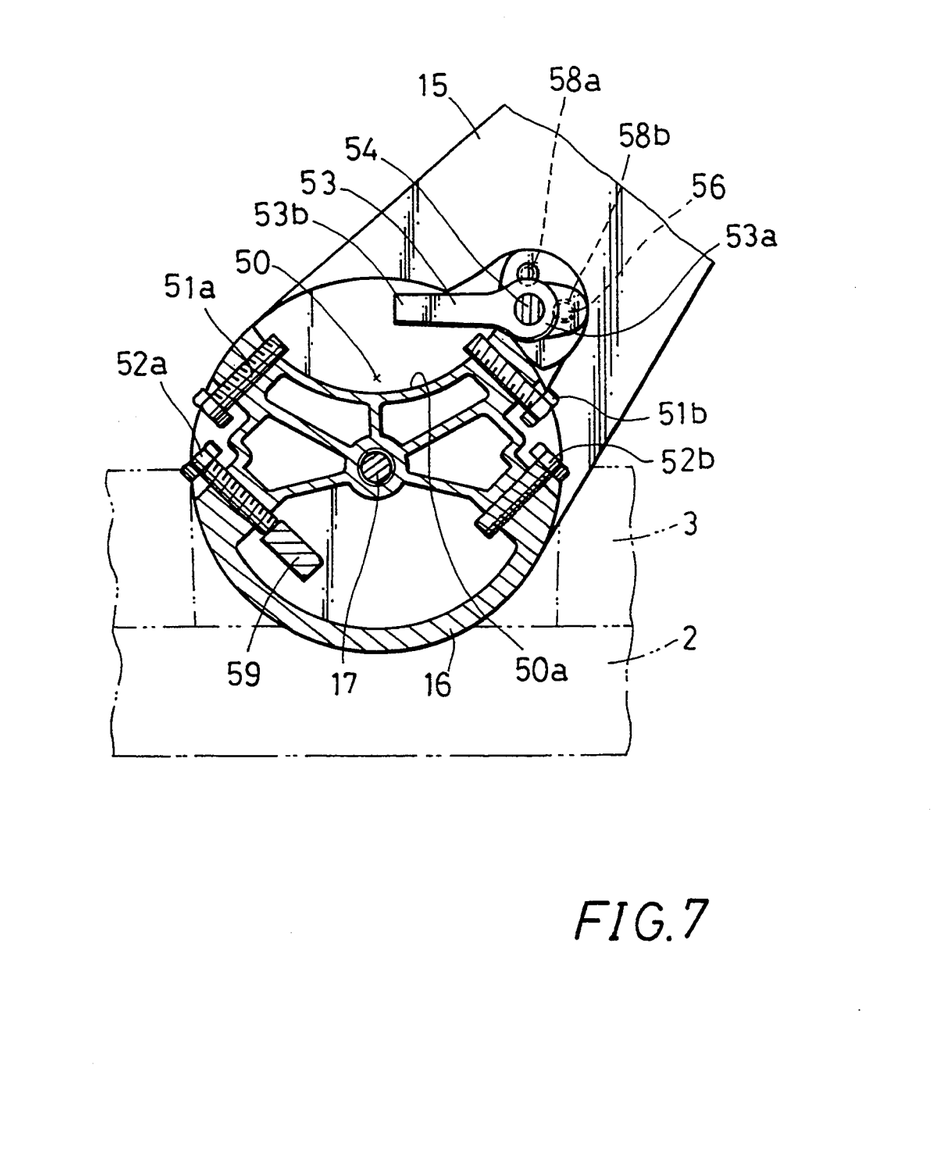
FIGS. 7 to 9 are views similar to FIG. 6 but showing different operations.

Returning to FIG. 4, a recess 50 is formed on the front portion of the upper half of the bracket 14 and is opened at its upper portion. As shown in FIG. 6, the recess 50 has an arcuate bottom surface 50a. A first pair of stopper bolts 51a and 51b are screwed into the upper half of bracket 14 and have one ends extending upwardly from the bottom surface 50a. The stopper bolts 51a and 51b are positioned on the opposite sides of a vertical plane which passes through the central axis of the support bolt 17. The stopper bolts 51a and 51b are inclined obliquely relative to the vertical plane by an angle of 45°, respectively. A second pair of stopper bolts 52a and 52b are screwed into the lower half of the bracket 14 and extend obliquely downwardly relative to the vertical plane at an angle of 45°, respectively, on the opposite sides of the vertical plane. A stopper lever 53 is pivotally mounted on a front surface of the middle portion of the support member 15 and includes, at its upper portion, a boss 53a which is rotatably supported by the support member 15 through a support pin 54. The stopper lever 53 includes a stopper portion 53b positioned within the recess 50. The lower end of the stopper portion 53b can be selectively positioned for abutment on the upper end of one of the pair of the stopper bolts 51a and 51b through pivotal movement of the stopper lever 53. An extension 53c is integrally formed with the front portion of the stopper portion 53b for operation by the operator. The longitudinal axis of the support pin 54 is positioned on the vertical plane which passes through the central axis of the support bolt 17. The boss 53a of the stopper lever 53 slidably contacts the front surface of the middle portion of the support member 15. Further the boss 53a includes a longitudinal hole 55 in which an engaging ball 56 is partly received. The engaging ball 56 is biased toward the front surface of the support member 15 by a spring 57. On the other hand, the front surface of the support member 15 includes engaging recesses 58a and 58b which are leftwardly and rightwardly displaced from the vertical plane around the axis of the support pin 54 at an angle of 45°, respectively. Thus, the stopper lever 53 can be kept in position where the stopper portion 53b is in alignment with either of the stopper bolts 51a and 51b when the engaging ball 56 is brought into engagement with either of the engaging recesses 58a and 58b. A stopper member 59 having substantially rectangular configuration in section is integrally formed with the boss portion 15a of the support member 15 and extends horizontally within the lower part thereof. The end portion of the stopper member 59 protrudes into the bracket 14 for abutment on either of the second pair of the stopper bolts 52a and 52b. The stopper member 59 is positioned on the vertical plane which passes through the central axis of the support bolt 17 and that of the support pin 54.

The operation of the above embodiment will now be explained in connection with the operation for inclining the miter saw unit 21 laterally leftwardly or laterally rightwardly relative to the vertical position as well as the oblique cutting operation through movement of the miter saw unit 21 in the horizontal direction relative to the base 2.

Firstly, the support bolt 17 is loosened to some extent to permit lateral pivotal movement of the support member 15 relative to the bracket 14. As the support member 15 is pivoted rightwardly in FIG. 2 around the bracket 14, the miter saw unit 21 is moved together with the support member 15 to be inclined from the vertical position shown by a solid line to a rightward position shown by a chain line in FIG. 2 where the saw blade 36 is inclined at an angle of 45° relative to the vertical plane. At this stage, the stopper portion 53b is moved away from the left side stopper bolt 51a of the first pair and lies substantially horizontally while left side surface of the stopper member 59 abuts on the left side stopper bolt 52a of the second pair. Further, the motor housing 40 accommodating the motor 41 lies horizontally at a position above the turntable 3 and the fence 6 since the longitudinal axis of the motor housing 40 as well as that of the motor 41 and the motor shaft 42 obliquely extends relative to the saw blade 36 by the angle of 45°.

The support bolt 17 is thereafter tightened so as to fix the support member 15 to the bracket 14.

The motor 41 is started to rotate the spindle 38 together with the saw blade 36. Thus, as the motor shaft 42 is rotated, the bevel gear 39 which is in engagement with the gear 42a of the motor shaft 42 is rotated, so that the saw blade 36 is rotated with the spindle 38. The operator thereafter pulls the miter saw unit 21 on his side, with the aid of the bearing cylinder 19a formed as the angular ball spline, so that the slide bar 18 is drawn toward the operator relative to the support member 15 in a rightward direction in FIG. 1. As the operator presses the miter saw unit 21 downwardly to pivot the miter saw unit 21 around the support shaft 30 of the hinge member 22 so as to move the miter saw unit 21 from its uppermost position to the lowermost position, the safety cover 48 is moved by the operational link 49 to uncover the exposed half of the saw blade 36 in response to movement of the miter saw unit 21. Consequently, the operation can be performed to cut a work which is placed on the turntable 3 and is fixed in position. Here, the movement of the slide bar 18 relative to the support member 15 is stopped through abutment of the stopper member 26 on the cover member 20. Further, the lowermost position of the miter saw unit 21 is determined by the stopper bolt 46 which abuts on the stopper member 47. When the miter saw unit 21 reaches the lowermost position, the lower part of the saw blade 36 extends downwardly from the plate 8 through the cut-out recess 7 formed therein. As for the motor housing 40 accommodating the motor 41, since the longitudinal axis of the motor housing 40 is inclined relative to the saw blade 36 by the angle of 45° as described above, the motor housing 40 lies horizontally above the turntable 3 and the fence 6 and is spaced therefrom, so that the motor housing 40 may not abut on the work to be cut.

When the operator pushes the miter saw unit 21 together with the hinge member 22 away from him while keeping the miter saw unit 21 at the lowermost position, the slide bar 18 is moved to return to the left in FIG. 1, so that the oblique cutting operation of the work can be performed.

When the operator releases the downward pressing force applied to the miter saw unit 21 after completion of the cutting operation, the miter saw unit 21 is returned to the uppermost position by the biasing force of the compression spring 45, and the safety cover 48 is also returned to cover the exposed half of the saw blade 36 in response to such a movement of the miter saw unit 21.

If the operator wishes to return the miter saw unit 21 from the above rightwardly inclined position to the vertical position, the operator moves the miter saw unit 21 to pivot in a reverse direction or the left side direction. When the miter saw unit 21 reaches the vertical position, the stopper portion 53b of the stopper lever 53 again abuts on the stopper bolt 51a of the first pair, so that the miter saw can be operated to vertically cut the work. At this stage, the stopper member 59 of the support member 15 is moved away from the stopper bolt 52a of the second pair and is positioned at a middle position between the stopper bolts 52a and 52b.

Figure 8:
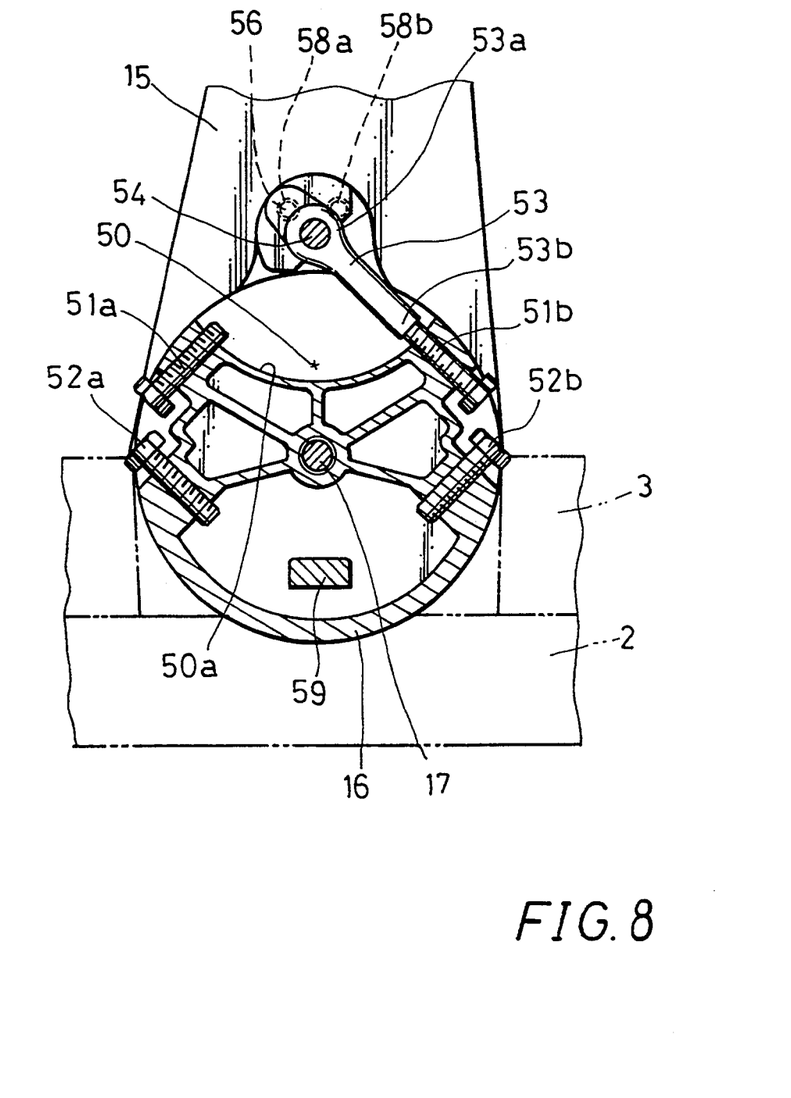
Figure 9:
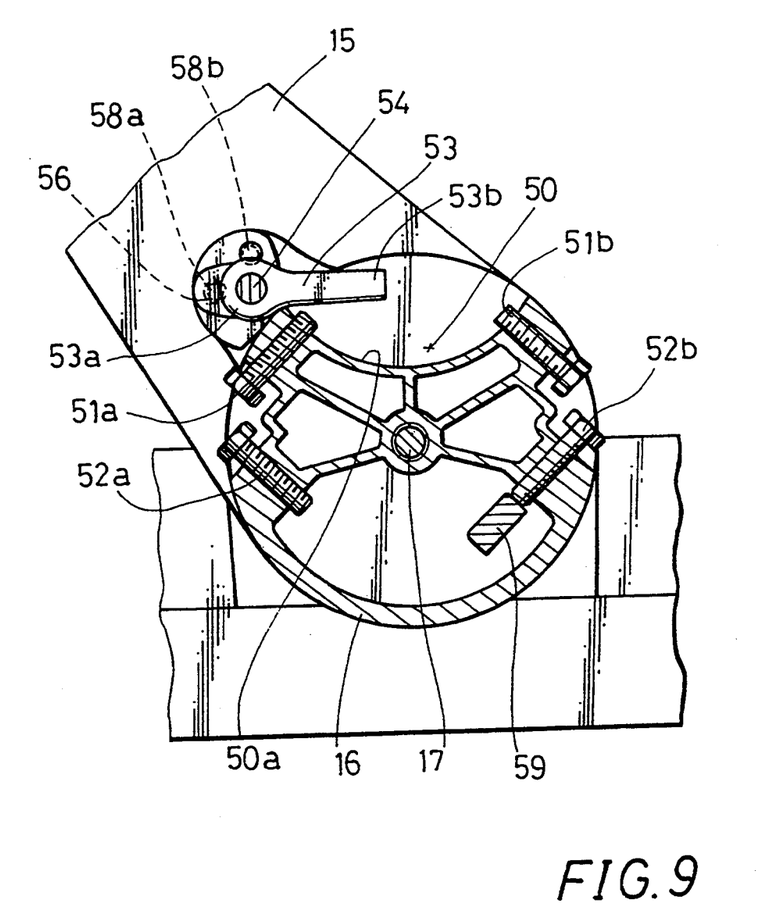

If the operator wishes to leftwardly incline the miter saw unit 21 from the vertical position, he moves the stopper lever 53 to the position for abutment on the stopper bolt 51b of the first pair as shown in FIG. 8. The operator thereafter loosens the support bolt 17 to permit movement of the support member 15 relative to the bracket 14. Then, the operator moves the miter saw unit 21 to pivot the support member 15 relative to the bracket 14 in a leftward direction in FIG. 2. When the saw blade 36 reaches a position inclined at the angle of 45° relative to the vertical plane, the stopper portion 53b of the stopper lever 53 is moved away from the right side stopper bolt 51b of the first pair and lies substantially horizontally, while the right side of the stopper member 59 of the support member 15 abuts on the right side stopper bolt 52b of the second pair as shown in FIG. 9. At this stage, the longitudinal axis of the motor housing 41 as well as that of the motor 40 extends vertically and the motor housing 41 is kept to be spaced from the turntable 3 and the fence 6.

The support bolt 17 is again tightened to fix the support member to the bracket 14, so that the oblique cutting operation on the opposite side can be performed. Particularly, in this operation, an inked line drawn on the work can be easily recognized by the operator, so that the cutting operation can be reliably performed.

If the operator wishes to return the miter saw unit 21 from the leftwardly inclined position to the vertical position, the operator pivots the miter saw unit 21 in a reverse direction. When the miter saw unit 21 reaches the vertical position, the stopper portion 53b of the stopper lever 53 abuts on the stopper bolt 51b of the first pair, so that the vertical cutting operation can be again performed. At this stage, the stopper member 59 of the support member 15 is moved away from the right side stopper bolt 52b of the second pair and is positioned at the middle position between the stopper bolts 52a and 52b as shown in FIG. 8.

Meanwhile, the position of the stopper portion 53b of the stopper lever 53 is kept at either the positions for abutment on the first pair of the stopper bolts 51a and 51b through engagement of the engaging ball 56 with the corresponding engaging recess 58a or 58b.

As described above, the miter saw 1 of the above embodiment can be used for the oblique cutting operation by laterally inclining the miter saw unit 21 in either of leftward and rightward directions, and therefore, the oblique cutting operation for both opposite sides can be easily performed for a work having a deformed profile in section as well as a work having a longer length.

Although the operation has been described in connection with the cutting operation by moving the miter saw unit 21 in the horizontal direction, a normal cutting operation can be also performed by moving the miter saw unit 21 to simply pivot downwardly. Further, since each of the first pair of the stopper bolts 51a and 51b as well as each of the second pair of the stopper bolts 52a and 51b can be operated to change the position of the end portion, the inclined position of the saw blade 36 in both leftward and rightward directions as well as the vertical position can be easily adjusted and can be easily determined.

Additionally, the operation for fixing the support member 15 to the bracket 14 and for releasing the same can be performed at a position on the pivotal axis of the support member 15 through the support bolt 17 and the nut 17a. Therefore, the construction becomes simple and the fixing operation can be reliably performed without causing unstable support of the support member 15.

Further, with such a construction, cutting chips or dust may not enter the pivotal support portion of the support member 15, and the cutting chips or the dust will not be adhered to the stopper member 59 or the second pair of the stopper bolts 52a and 52b for abutment on the stopper member 59 since they are disposed within the support shaft 16 of the bracket 14.

While the invention has been described with reference to a preferred embodiment, it is to be understood that modifications or variation may be easily made without departing from the spirit of this invention which is defined by the appended claims.

What is claimed is:

1. A miter saw comprising:
   a base on which a work is placed;
   a miter saw unit supporting a saw blade and having a motor for driving said saw blade, said motor having a motor shaft extending in a longitudinal direction of said motor;
   a transmission mechanism for transmitting rotation of said motor to said saw blade;
   a support mechanism supporting said miter saw unit relative to said base for vertical pivoting of said miter saw unit relative to said base, and means for mounting said miter saw unit for laterally pivoting between a vertical position and an inclined position, said saw blade having a rotational axis extending substantially horizontally when said miter saw unit is at said vertical position, and the rotational axis of said saw blade extending obliquely relative to the horizontal direction when said miter saw unit is at said inclined position;
   said motor being positioned on one lateral side of said miter saw unit toward said inclined position and substantially laterally aligned with said saw blade, wherein when in said vertical position said motor extends to a vertical height above said base generally equal to the vertical height of said saw blade above the base;
   said rotational axis of the saw blade has a longitudinal direction, and the motor shaft of said motor is positioned so that the longitudinal direction of the saw blade axis and the motor shaft define a plane which is perpendicular to the saw blade and to the base;
   said motor shaft of the motor extending obliquely relative to the rotational axis of said saw blade and extending obliquely upward relative to said saw blade and said base when said miter saw unit is at said vertical position, and said support mechanism including means for limiting the pivoting angle of said miter saw unit to a predetermined oblique angle so that the longitudinal axis of said motor lies horizontally when said miter saw unit is pivoted to said predetermined oblique angle.

2. The miter saw as defined in claim 1 wherein said saw blade is mounted on a spindle defining said rotational axis and drive by said motor through said transmission mechanism; said motor shaft is disposed adjacent said spindle; and said transmission mechanism includes a bevel gear mounted on said spindle and a spur gear mounted on said motor shaft and engaged with said bevel gear.

3. The miter saw as defined in claim 2 wherein said predetermined oblique angle is 45° and said longitudinal axis of said motor is inclined with respect to said rotational axis of said saw blade by an angle of 45°.

4. The miter saw as defined in claim 1 wherein said support mechanism supports said miter saw unit for slidable movement of said miter saw unit relative to said base in the horizontal direction.

* * * * *